(12) United States Patent
Zhou

(10) Patent No.: US 8,156,902 B2
(45) Date of Patent: Apr. 17, 2012

(54) GAS-STEAM ENGINE

(76) Inventor: Huaqun Zhou, Yiwu (CN)

( * ) Notice: Subject to any disclaimer, the term of this patent is extended or adjusted under 35 U.S.C. 154(b) by 1194 days.

(21) Appl. No.: 11/573,844

(22) PCT Filed: Jun. 14, 2005

(86) PCT No.: PCT/CN2005/000844
§ 371 (c)(1),
(2), (4) Date: Aug. 10, 2007

(87) PCT Pub. No.: WO2006/024209
PCT Pub. Date: Mar. 9, 2006

(65) Prior Publication Data
US 2008/0087002 A1    Apr. 17, 2008

(30) Foreign Application Priority Data
Aug. 19, 2004  (CN) .......................... 2004 1 0070086

(51) Int. Cl.
*F02B 47/02* (2006.01)
(52) U.S. Cl. .................................. 123/25 C; 123/25 R

(58) Field of Classification Search ................. 123/25 R, 123/25 C, 25 J–25 N
See application file for complete search history.

(56) References Cited

U.S. PATENT DOCUMENTS

| 6,095,100 A * | 8/2000 | Hughes ........................ 123/25 C |
| 2003/0188700 A1 * | 10/2003 | Mitsuhashi et al. ........ 123/25 C |

\* cited by examiner

*Primary Examiner* — Noah Kamen
(74) *Attorney, Agent, or Firm* — Fox Rothschild LLP

(57) ABSTRACT

The gas-steam engine of this invention is divided into boiler, turbine and piston reciprocating types. This engine controls the burning through the binary or ternary gas supply system, producing the hi-temperature and hi-pressure gas and steam or mixture by utilizing the kinetic and heat energy form by burning, so as to do work by the above gas, as well as reclaiming the heat consumed heat at the same time, with the steam reverted and recycled for use after doing work. Therefore, it radically the great energy waste and serious environmental pollution question in the existing heat engine. Compared with the former technology, it realizes the energy saving of about 75%, with little exhaustion.

7 Claims, 3 Drawing Sheets

GAS-STEAM ENGINE

FIELD OF THE INVENTION

The present invention relates to a kind of engine, which is applied to the motor vehicle, mechanical equipment, aircraft and ship.

BACKGROUND OF THE INVENTION

Currently, the world energy crisis and environmental pollution become increasingly severe, while there is a serious phenomenon of fuel waste and environmental pollution in the existing thermal engine. In the opinion of the patent applicant, it is pivotal for the deep research on the burning mechanism to solve the technical problem. Currently, people generally consider burning kinetic energy as heat energy, which the inventor thinks that kinetic energy and heat energy are generated along with burning. Burning is considered as the release of high density (kinetic energy) and heat under the chemical reaction. For example, burning of C and $O_2$ produces $CO_2$; when compared with $CO_2$, C is the hi-density solid, contrarily, when compared with C, $CO_2$ is a minute-density gas. Even fuel gas requires to be condensed to certain density for burning, for instance liquefied natural gas and liquefied petroleum gas.

Burning heat energy is produced with kinetic energy, namely, under the chemical reaction, heat energy is produced during the course of releasing the density; the faster high density is released, the greater kinetic energy is, the more working substance consumed, the larger volume of high density released is, namely the more kinetic is and the more heat energy is produced; the kinetic energy of the explosion of the powder and fuel (heavy combustion) is the typical example. Although kinetic energy may disappear with losing of heat energy, however, the heat energy may increase with increasing of kinetic energy. Examples include the compression heat pump. They are co-existing and mutually converting in a direct ratio, namely, the more kinetic energy is, the more heat energy is, and contrarily the more the heat energy is, the more the kinetic energy is, but they are two different kinds of energy. Because during the course of burning, kinetic energy and heat energy are in direct ratio, which is why kinetic energy is applicable in computation and research based on the thermodynamics, which is why the research and design of the heat engine can be in conclusion from the thermodynamics. For the engine, kinetic energy is direct energy, while heat energy is indirect energy, which must be converted through the media, for instance the boiler produces steam to drive a steamer. Heat energy is direct energy to heating and cooking, for example, the home gas appliances can cook and bath by burning heat energy, without utilizing the kinetic energy, while the existing heat engines utilize only kinetic energy, with heat energy wasted with the cooling system and exhausting system; the boiler of the steamer set utilizes only the heat energy during the courses of burning, with the kinetic energy wasted in smoke, which can pollute the environment severely.

SUMMARY OF THE INVENTION

The inventor applying for the patent thinking from the understanding of the simultaneous producing of the kinetic energy and heat energy offers a kind of engine producing the gas and steam by burning, reclaiming the heat energy consumed during burning, to achieve radical energy-saving, environmental protection, with simple and reliable structure and high power and density.

Therefore, three solutions are given describing the technical conception:

The gas-steam boiler, including the three machines combination of ignition engine, steamer and magnetor, and binary gas supply system and water-steam circulating system, consisting of boiler, combustion chamber, dual-side centripetal turbine, volute casing, axis, heat exchanger, binary gas supplying system, steam intake duct, steam exhaust duct, preheater, steam condenser, fan, magnetor and water supply pump. Under the water level of the detachable heat preservation boiler water, after doing work on dual-side centripetal turbine gas turbine side, the gas burning the fuel and oxygen is exhausted from the boiler through the exchanger, where the water absorbs the fuel's heat energy to turn into the hi-pressure steam to drive the dual-side centripetal turbine steam turbine side. After doing work, through the pre-heater in the exhaust duct, the steam heats water, meanwhile steam is also cooled and led into the steam condenser and reverted to the liquefied water, which will be pumped into the pre-heater after filtering, and then enters into the boiler for recycling through the single-direction valve after absorbing the remained heat.

For simple structure, the boiler and the magnetor can be integrated on one coaxial machine, to form a parallel connected mixed dynamic system, offering the start-up and power supply for the boiler.

The stated dual-side centripetal turbine is combined by the centripetal turbine back to back, with the one side of gas turbine, and the other side of steam turbine, where the steam and gas do work through the same centripetal turbine.

Because of doing work along with the gas and steam, the dual-side centripetal turbine can reduce heat lose mutually. For being lower than the gas temperature, the steam entering into the dual-side centripetal turbine can still be expanded by heating, when the turbine is also cooled at the same time.

The stated binary gas supply system consists of electronic oxygen spraying system and electronic fuel injection, sharing the electronic controlling system, respectively spraying or utilizing the hi-pressure oxygen on equivalence ratio of driving fuel, sharing one muzzle to spray (sprayer-type).

This binary gas supply system has solved many problems, including technical extensive gas supply, low-efficiency, high-consumption, low power density and serious pollution to the environment, achieving the mixture proportion and gas supply capacity under the precise control, with high energy-saving and high power density, radically stopping the production of NOx and notably reducing production of pollutants including CO and HC.

For 21% of oxygen in the air, the oxygen-fuel ratio is 21% of the air-fuel ratio, for instance, the air-fuel ratio of petrol is 14.7:1, thus the air-fuel ratio may be 3.1:1. The pure oxygen can promote burning; kinetic and heat energy can be released in a shorter time compared with burning on the air-fuel ratio. In addition, the cubage of the combustion chamber or cylinder is reduced, so the flame spreading time is reduced, producing higher temperature compared with burning on the air-fuel ratio. Therefore the temperature difference between water in the boiler is increased, achieving rapider heat exchange, increasing the waster temperature difference with the exhaustion vent or smoke vent, and reducing the heat lost. For outstanding energy-saving, the fuel carried, and cubage and weight of the engine are also reduced, compensating the cubage of the carried oxygen bottle and lack of weight.

The working principle of the gas-steam boiler offered by the invention is shown as: under the water level of the heat preservation boiler, after doing work dual-side centripetal turbine gas turbine side, the gas burning the fuel and oxygen is exhausted from the boiler through the exchanger, where water absorbs the fuel's heat energy to turn into the hi-pressure steam to drive the dual-side centripetal turbine steam turbine side. After doing work, through the pre-heater in the exhaustion duct, the steam heats water, while the steam is also condensed to enter the steam condenser and be reverted to the hi-temperature liquefied water, which will be pumped into the pre-heater, and then enters into the boiler for recycling through the water supply pump after absorbing the remained heat. The coaxial magnetor can be in a parallel connected dynamic system relation, besides offering the startup and power supply for the boiler.

This invention is a kind of gas-steam boiler, installing the coaxial combustion engine and steamer under the water level of the heat-preservation boiler, with optional disassembly line; optional flange connection, adopting the integrated manufacturing for the shell of the combustion engine and steamer, and soft metal sealing mat selected for sealing, with the spindle sleeve integrated with the external shell extending to the flange joint of the boiler, achieving the function of separating the water and hi-pressure steam, with optional hollow shaft oil channel pressure lubrication. The exhausted gas of combustion engine is Led into the exchanger, where the exhausted gas will be exhausted outside the boiler through a vent after heat exchanging, thus there is little heat lost during the course of working by the combustion engine, only a little part of lose in the exhaustion. However, there is still the heat losing of smoke in the existing boilers, and most of the heat is absorbed by the water boiler in the boiler to produce the hi-pressure steam and enters the steam channel to drive the steamer. After doing work, the steam gets through the pre-heater in the exhaustion channel, pre-heating water supply of the boiler meanwhile steam also cooled; then it is led into the steam condenser, condensed to the hi-temperature (over 95) liquefied water through the coaxial or synchronous fan or natural wind or water stream (including the windward or water-ward of the motor vehicles, vessels and aircrafts) with the gas-steam boiler, pumped into the pre-heater by the coaxial or synchronous water supply pump through filtration, entering into the boiler for recycling through the single-direction valve after absorbing the remained heat of steam. The gas-steam boiler has a power bigger than the sum of the two combustion engines and steam sets (boiler) of the same energy consumption in the existing technology, with a energy consumption of only that of a combustion engine, without noise and pollution.

In order to meet the requirement of internal installation of the boiler, it is necessary to simplify the combustion engine and steamer as well improve the power density or reliability, therefore, the binary gas supply system, which only meets the above requirements, but also realizes more energy saving and almost zero exhaustion, keeping the energy consumption of the gas-steam boiler on the former level, making greater improve in saving energy, namely remarkably improving the power. For recycling utilization for boiler water, the boiler size can be made more compact, just meeting the heat exchanging and steam load or flux.

For simple structure, the boiler and the magnetor can be on a coaxial machine, to form a parallel connected mixed dynamic system, which also offers startup and power supply for the boiler, realizing more energy saving, reliability and environmental protection. Thus, the combustion engine is combined with the hearth of the boiler, the heat exchanger replacing the vent-pipe of the combustion engine, the steam condenser replacing the heat radiator of the combustion engine, the pre-heater replacing the heat regenerator of the combustion engine, the boiler replacing the cooling system of the combustion engine, and the combustion engine replacing the assistant dynamic force.

It is the gas-steam turbine, combining the gas turbine and steam turbine, sharing a set of turbine, including the binary gas supply system, combustion chamber, volute casing, circle channel low-pressure over-heater, circle channel high-pressure over-heater, steam condenser, axis, turbine, water supply pump, pre-heater, loop injection steam inlet, steam exhausting way, fan, water filter and vent, installing the heat-preservation channel over-heater (DC Boiler) on the external surface of the ball-shaped combustion chamber and volute casing. Water is supplied by the steam condenser and gas-steam turbine, becoming the steam absorbing absorbed the remained heat of exhausted gas; after entering the pre-heater, after entering the low-pressure over-heater to absorb the heat of turbine and entering the hi-pressure over-heater to absorb the heat of the combustion chamber, then it enters the loop injection steam inlet, mixed with the hi-temperature gas before entering the turbine and then it absorbs the gas and expands to promote turbine and axis together to do work; the exhausted steam gets through the pre-heater in the exhaustion channel, pre-heating the water supply of the boiler, the exhausted steam also cooled, then led into the steam condenser, reverted into the hi-temperature (over 95) liquefied water after cooling, then it enters the water pump for recycling after filtering, $H_2O$ gas produced by the burning also liquefied, with little exhausted $CO_2$ through the vent of the steam condenser.

The foreside ducted internal diameter (exit of the combustion chamber) of stated loop injection steam inlet is smaller than the circle injection steam inlet. During the course of crossing of hi-temperature and hi-pressure gas, negative pressure is produced in the circle gap, forming intense injection function, and the relative low-pressure steam will enter the duct to mix with the gas.

The inlet temperature of the turbine of the mixed gas is decided by the gas expansion limiting temperature and steam expansion limiting temperature, in about 800° C., for the steam can be divided into $H_2$ and $O_2$ in about 850° C., where the capability of working is similar to the gas. In addition, 800° C. is close to the expansion limiting temperature of the gas.

Gas-steam internal-combustion engine, two-stroke, including the ternary gas supply system, cylinder cover, combustion chamber, cylinder, multi-hole vent, crankcase, piston and piston ring, crankshaft connecting rod; the gas supply, gas distribution and gas scavenge are all controlled by the ternary gas supply system, which consists of the electronic water spraying system and binary gas supply system. The stated two-stroke consist of: the first stroke, the piston moves down-to-up, hi-pressure water mist sprayed into the cylinder before compressing, processing gas scavenge, then it becomes the steam after scavenging the wasted gas for hi-temperature still in the cylinder, cooling the cylinder. During the course of compressing (usually in the later period in order to reduce the compression power), oxygen and fuel sprayed into the cylinder for once or several times and mix it; and when the piston is at top stop, the mixed gas is combusted spontaneously (pressed to be ignited) due to the compression effect or ignited; the second stroke, the piston moves up-to-down; when the piston moves over top spot because of inertia, the hi-temperature and hi-pressure gas produced by the explosion combustion heats plenty of low-temperature and low-pressure steam compressed in the cylinder, producing intense expansion to push the piston to move downward together, and exhausting the waste steam, then it enters the first stroke; the exhausted steam is led into the steam condenser, reverted to the liquefied water after cooling, entering the water pump for recycling after filtering, the $H_2O$ gas produced by the burning also liquefied, with little exhausted $CO_2$ through the vent of the steam condenser.

In order to improve the efficiency of gas exhaustion and scavenging, the multi-hole exhausting hole to exhaust the steam is adopted. In addition, for the gas supply and scavenging is unrelated with the crankcase, so the splash lubrication can be adopted.

The electronic water spraying system is basically similar to the existing electronic fuel injection, with the steam condenser as the water supply, sharing electronic controlling system, spraying or utilizing the hi-pressure oxygen driving water spraying respectively (sprayer-type).

Under guaranteeing the equivalent weight oxygen delivery ratio, the water delivery ratio shall be increased by the best to increase the steam volume, namely kinetic energy (similar to the existing lean-burn technology). For the burning temperature is reduced greatly compared with the former technology, it is unnecessary to install the cooling system. Moreover, the cylinder and external wall of cylinder cover need heat-insulation. The heat preserved by the cylinder metal is utilized to gasify the water mist. The heat isolation cylinder mat is used between the cylinder and crankcase, so as to reduce the heat loss for heat transferring. The temperature of the water spraying in the cylinder, namely the cooling degree of the steam condenser is decided by the fuel or compression ratio, namely the temperature of the cylinder after exhaustion.

Using ternary gas supply, the capacity of the single cylinder of the gas-steam internal-combustion engine can be made to be very large, reducing complexity and cost of multi-cylinder (in order to keep balance and crank for working at 360° the dual-cylinder is usually used).

The soft metal is adopted to make the sealing mat between core components of the gas-steam engine, for instance: made by software metal including lead, tin, zinc or aluminum.

The existing sealing mats are basically made of the paper and rubber materials, with a common disadvantage, which is that they are all non-conductor of heat, making the heat produced by the machine difficult to transfer and radiate rapidly. Temperature difference is produced between the sealing pieces, causing different heat expansion and cold shrink between the sealing pieces. It is easy to incur bad result because its material of the sealing mat, short life and easy aging and decomposition.

For the metal sealing mat is made of the soft metal, realizing no heat resistance, without occurrence of bad sealing and over temperature, longer life, not easy to be aging or decomposing, increasing the integrity and beauty of the machine.

For utilizing burning kinetic energy and heat energy at the same time, adopting the binary burning and remained heat reclaiming and reclaiming the energy consumed in oxygen producing, with a working capacity of the steam over once greater than the air-fuel burning product under the equal pressure, the gas-steam engine radically solves the great heat wasting and environmental pollution problems in the existing combustion engines, achieving amazing effect:

(1). Realizing extreme energy-saving, about 75% can be saved, namely, it consumes only 25% of the fuel to produce the motive power;

(2). For it is easy to deal with the hi-purity $CO_2$, the zero exhaustion can be reached;

(3). Simple and compact structure has reached the highly power density and reliability.

DETAILED DESCRIPTION OF THE EMBODIMENTS

The attached figure has described one optimal practical case for the three kinds of gas-steam engines.

Figure 1:
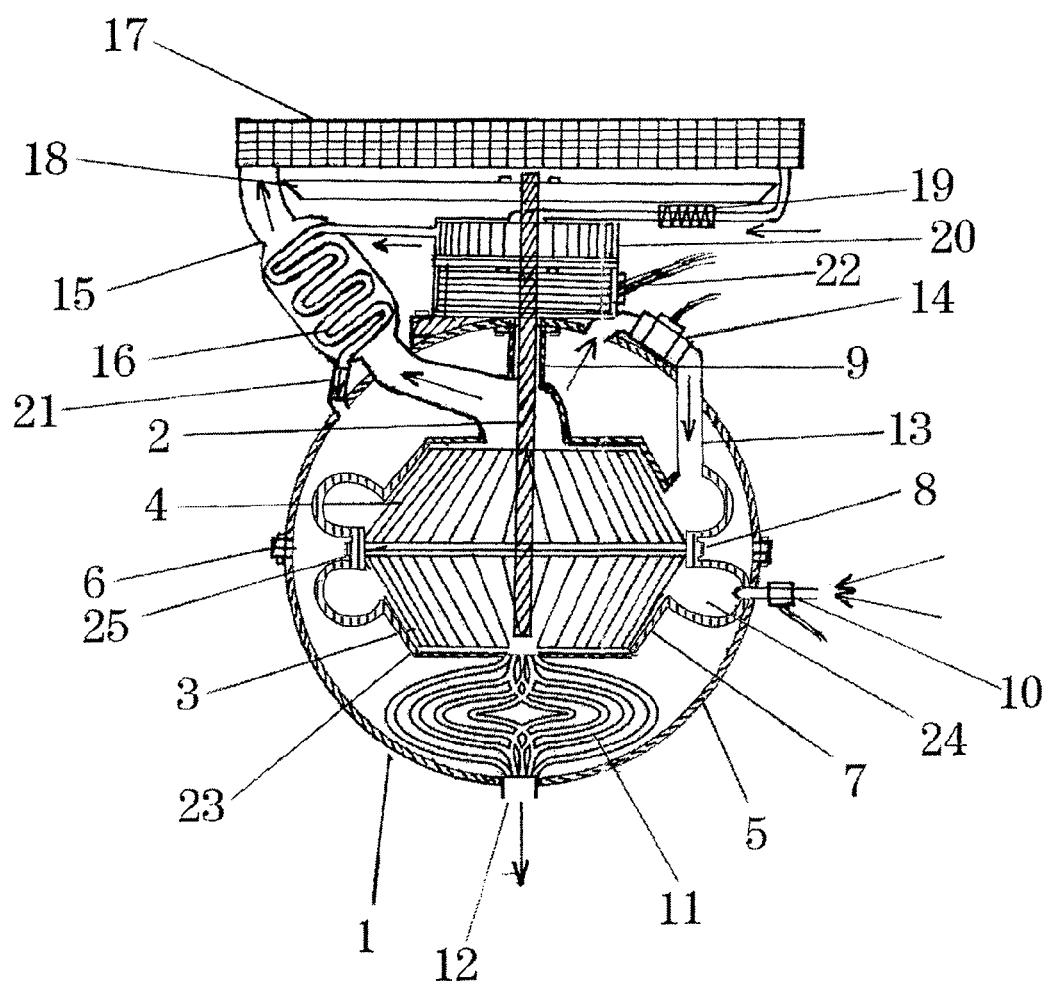
FIG. 1: the sectional view of gas-steam boiler of this invented engine.

As shown in the FIG. 1: gas-steam boiler 1, installing the coaxial 2 combustion engine 3 and steamer 4 under the water level of the heat-preservation boiler 5, with optional disassembly line 6, optional flange connection, adopting the integrated manufacturing for the shell 7 of the combustion engine 3 and steamer 4, and soft metal sealing mat 8 selected for sealing, with the spindle sleeve 9 integrated with the external shell 7 extending to the flange joint of the boiler 5, achieving the function of separating the water and hi-pressure steam, with optional hollow shaft 2 oil channel pressure lubrication. The heat exchanger 11 is led to the exhaustion of the combustion engine 3 through the binary gas supply system 10, where the exhausted gas will be exhausted outside the boiler 5 through a vent 12 after heat exchanging, thus there is little heat lost during the course of working by the combustion engine 3, only a little part of lose in the exhaustion. However, there is still the heat losing of smoke in the existing boiler, and most of heat is absorbed by water boiler 5 in the boiler to produce the hi-pressure steam to enter into the steam channel 15 to drive the steamer. After doing work, steam gets through the pre-heater 16 in the exhaustion channel, pre-heating the water supply of the boiler 5, steam also cooled, then led into the steam condenser 17, condensed to the hi-temperature (over 95° C.) liquefied water through the coaxial 2 or synchronous fan 18 or natural wind or water stream (including the windward or water-ward of the motor vehicle, vessel and aircrafts) with the gas-steam boiler, pumped into the pre-heater by the coaxial 2 or synchronous water supply pump 20 through filter 19, entering into the boiler 5 for recycling through single-direction valve 21 after absorbing the remained heat of steam. For recycling utilization for water in boiler 5, the boiler size can be made more compact, just meeting the heat exchanging and steam load or flue. For simple structure, the boiler and magnetor 22 can be integrated on a machine on coaxial 2, to form a parallel connected mixed dynamic system 23, which also offer startup and power supply for the boiler 1.

The working principle: under the water level of the heat preservation boiler 5, after doing work dual-side centripetal turbine 25 gas turbine side, the gas burning the fuel and oxygen of combustion chamber 24 is exhausted from the boiler 5 through the heat exchanger 11, where water absorbs the fuel's heat energy to turn into the hi-pressure steam to drive the dual-side centripetal turbine 25 steam turbine side. After doing work, pre-heating the water supply of the boiler 5, then led into the steam condenser 17 and reverted to hi-temperature liquefied water, which will be pumped into the pre-heater 16 through water supply pump 20, and then enters into the boiler 5 for recycling absorbing the remained heat. Magnetor 22 on coaxial 2 can be in a parallel connected dynamic system 23 relation with boiler 1, besides offering the startup and power supply for the boiler 1.

The core composition of the technical design of the gas-steam boiler, the dual-side centripetal turbine 25 is combined by the centripetal turbine back to back, with the one side of gas turbine 3, and the other side of steam turbine 4, where steam and gas does work through the same turbine 25. For doing work with the gas and steam, the dual-side centripetal turbine can reduce heat lose mutually. For being lower than the gas temperature, the steam entering into the dual-side centripetal turbine 25 can still be expanded by heating, the turbine 25 also cooled at the same time.

Figure 2:
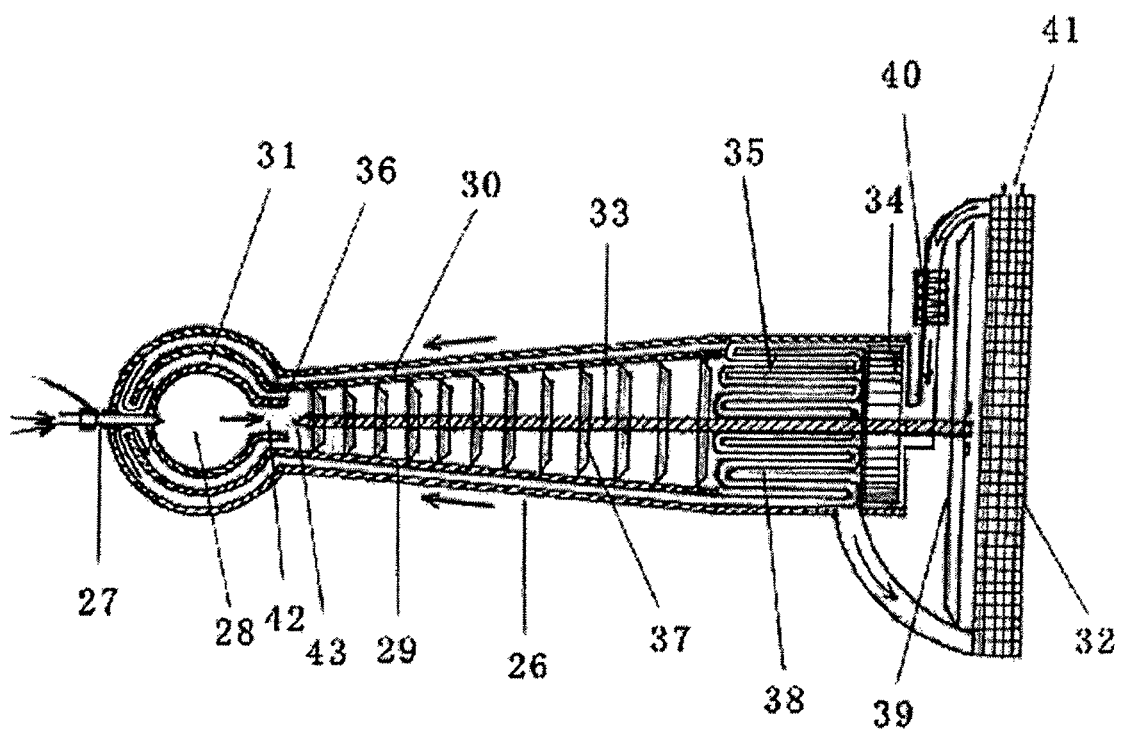
FIG. 2: the sectional view of gas-steam turbine of this invented engine.

As shown in the FIG. 2, it is the gas-steam turbine 26, installed the heat-preservation channel over-heater 30, 31 on the external surface of the ball combustion chamber 28 and volute casing 29. Water is supplied by steam condenser 32 and gas-steam turbine 26, coaxial 33 or synchronous water supply pump 34, becoming the steam after absorbing the remained heat of exhausted gas; after entering the pre-heater 35, after entering the low-pressure over-heater 30 to absorb the heat of volute casing 29 and entering the hi-pressure over-heater to absorb the heat of the combustion chamber, then entering the loop injection steam inlet 36, mixed with the hi-temperature gas before entering turbine 37 and then it absorbs the gas over-heat expanding, commonly pushing turbine 37 and axis 33 to do work; the exhausted steam gets through the pre-heater 35 in the steam exhaustion channel 38, pre-heating the water supply of the boiler 30, 31, steam also cooled, then led into the steam condenser 32, condensed to the hi-temperature (over 95° C.) liquefied water through the coaxial 33 or synchronous fan 39 or natural wind or water stream (including the windward or water-ward of the motor vehicle, vessel and aircraft), pumped into water supply pump 34 for recycling through filter 40, $H_2O$ gas produced by the burning also liquefied, with little $CO_2$ exhausted through the vent 41 of the steam condenser 32.

The foreside ducted 42 inner diameter (exit of the combustion chamber) of stated loop injection steam inlet 36 is smaller than circle injection steam inlet 43. During the course of crossing of hi-temperature and hi-pressure gas, negative pressure is produced in circle gap 36, forming intense injection function and the relative low-pressure steam will enter the duct to mix with gas 36.

Figure 3:
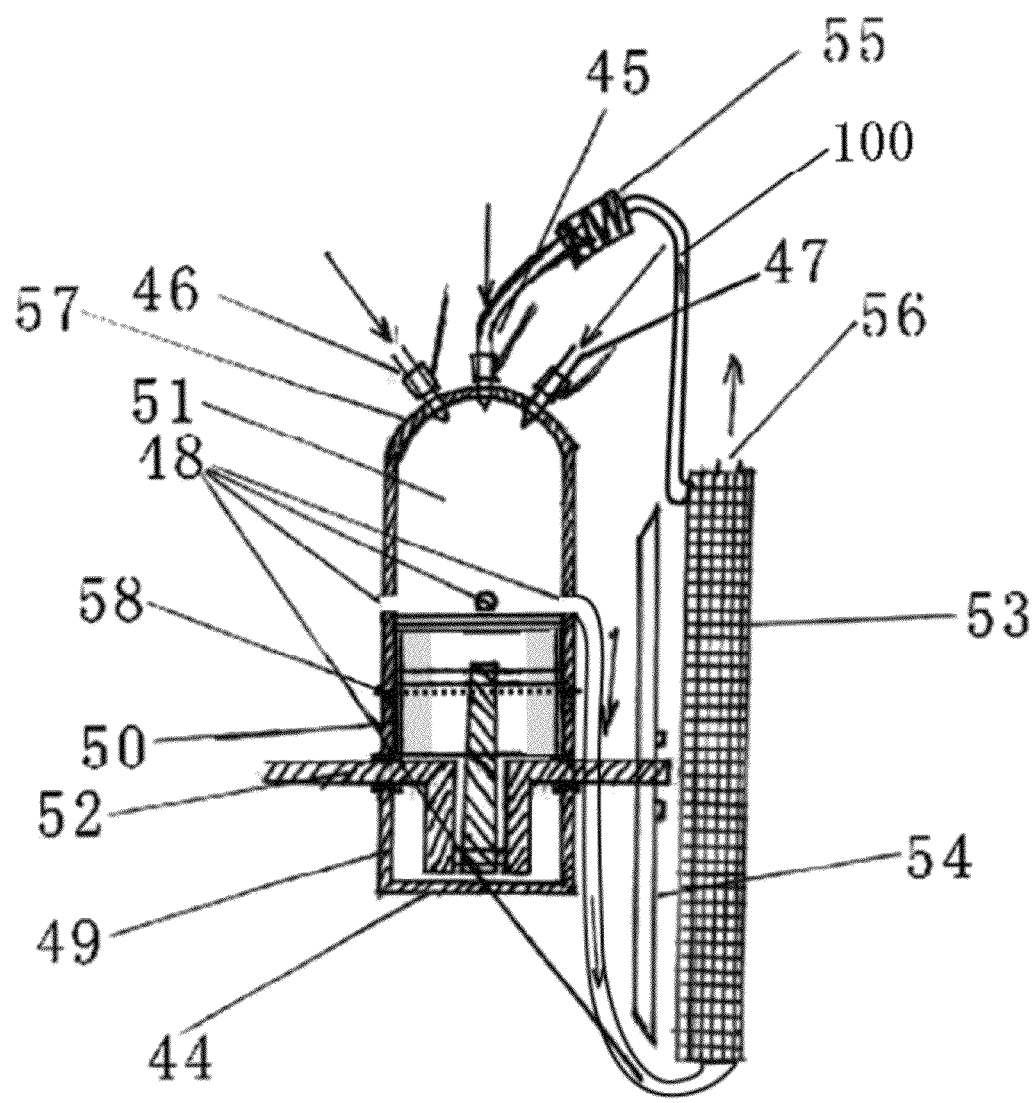
FIG. 3: the sectional view of gas-steam internal-combustion engine of this invented engine.

As shown in the FIG. 3, gas-steam internal-combustion engine 44, with the gas supply, gas distribution and gas scavenge are all controlled by the ternary gas supply system 45, 46, 47; in order to improve the efficiency of gas exhaustion and scavenging, the multi-hole exhausting hole 48 to exhaust the steam is adopted, in addition, for the gas supply and scavenging is unrelated with the crankcase 49, so the splash lubrication can be adopted. The stated ternary gas supply system 45, 46, 47 consists of the electronic water spraying system 45 and binary gas supply system 46, 47, sharing the electronic controlling system, spraying or utilizing the hi-pressure oxygen driving water spraying respectively (sprayer-type).

The first stroke, piston 50 moves down-to-up, electronic water spraying system 45 sprays hi-pressure water mist into the cylinder 51 before compressing, processing gas scavenge, and it becomes steam after scavenging the wasted gas for hi-temperature still in the cylinder 51, cooling the cylinder 51. During the course of compressing (in order to reduce the compression power, usually in the later period), the oxygen and fuel electronic control spraying system 46, 47 sprays the oxygen and fuel into cylinder 51 for once or several times and mix it (opposite spraying or sprayer-type spraying); and when piston 50 is at top spot, the mixed gas is combusted spontaneously (pressed to be ignited) due to the compression effect or ignited; the second stroke, piston 50 moves up-to-down; piston 50 moves over top point because of inertia, the hi-temperature and hi-pressure gas produced by the explosion combustion of oxygen-fuel ratio mixed gas heats up plenty of low-temperature and low-pressure steam compressed in the cylinder 51, producing intense expansion to push piston 50 to move downward together, doing work towards outside through crank 52, many vents 48 open, when the piston moving to bottom stop, exhausting the waste steam to enter into the first stroke; the exhausted steam is led into the steam condenser, condensed to the liquefied water through coaxial 52 or synchronous fan 54 or natural wind or water stream (including the windward or water-ward of the motor vehicle, vessel and aircraft), reverted to liquefied water after cooling, entering the electronic water spraying system 45 for recycling through the filter 55, $H_2O$ gas produced by the burning also liquefied, with little $CO_2$ exhausted through the vent 56 of steam condenser 53.

Under guaranteeing the equivalent weight oxygen-fuel ratio, the water-fuel ratio shall be increased by the best to increase the steam consumption, namely kinetic energy (similar to the existing lean-burn technology). For the burning temperature is reduced greatly compared with the current technology, it is unnecessary to install the cooling system. Moreover, cylinder 51 and external wall of cylinder cover 57 need heat-insulation, using the heat preserved in cylinder 51 metal to completely gasify water mist spraying into cylinder 51. Heat insulation and heat preservation are needed at the joint of the cylinder surface, cylinder cover surface and crankcase. Heat insulation cylinder mat 58 is used between cylinder 51 and crankcase 49, so as to reduce the heat loss for heat transferring. The temperature of the water spraying in the cylinder 51, namely the cooling degree of steam condenser 53 is decided by the fuel or compression ratio, namely the temperature of the cylinder 51 after exhaustion.

For ternary gas supply 45, 46, 47, the capacity of the single cylinder 51 of the gas-steam internal-combustion engine can be made to be very large, reducing complexity and cost of multi-cylinder 51. In order to keep balance and crank 52 for working at 360°, it is usually to use the dual-cylinder 51.

The implementation methods defined above with the attached figures did not limit the technical scheme offered by the invention. All of the reformation from the technical conception put forward by the invention shall be covered in the protected range of claim of the invention, for instance, using derived version of the DC boiler or drum boiler; using derived version of the axial or radial flow turbine; using derived version of exhausting the exhausted gas into the air directly; using derived version of boiler out-laid coaxial or non-coaxial steamer; using derived version of adding the gas compressor coaxial with the engine to replace the oxygen spraying system; change of component position, etc.

The invention claimed is:

1. A gas-steam internal-combustion engine, the engine is two-stroke, comprising:
    a ternary gas supply system to control the gas supply, gas distribution, and gas recovery, a steam condenser for exhaust separating and reclaiming, cylinder cover, combustion chamber, cylinder, multi-hole vent and steam exhaust pipe, crankcase, piston and piston ring, crankshaft connecting rod, and a fan;
    the ternary gas supply system adapted to
        spray high pressure water mist with a water spray system into the cylinder prior to a compressing up stroke, wherein said high-pressure water mist is completely vaporized by preserved heat within the cylinder, wherein the cylinder is cooled by said vaporized high-pressure water mist throughout said compressing up stroke, and wherein an oxygen and fuel injection system sprays a fuel mixture into said cylinder for combustion;
        venting exhaust steam as said piston completes a down stroke; and condense said exhaust steam into liquid water with a steam condenser, wherein the condensed liquid water recycled into said water spray system to be sprayed into said cylinder.

2. The engine according to claim 1, wherein said ternary gas supply system consists of the water electric controlling spraying system, oxygen controlling spraying system and fuel electric controlling spraying system, commonly using the electric controlling system, respectively spraying or utilizing the hi-pressure oxygen driving water to spray.

3. The engine according to claim 1, further comprising:
a heat insulation layer on the engine surface.

4. The engine according to claim 3, further comprising:
a heat insulation layer at the joint of the cylinder surface, cylinder cover surface and crankcase.

5. A method of producing gas and steam and reclaiming the heat energy of a two stroke gas steam internal combustion engine, comprising:
   (1) spraying high pressure water mist with a water spray system into the cylinder prior to a compressing up stroke, wherein said high-pressure water mist is completely vaporized by preserved heat within the cylinder, wherein the cylinder is cooled by said vaporized high-pressure water mist throughout said compressing up stroke, and wherein an oxygen and fuel injection system sprays a fuel mixture into said cylinder for combustion;
   (2) pushing said piston downward by combustion exhaust produced by said combustion and venting exhaust steam as said piston completes a down stroke,
   (3) repeating said up and down strokes alternately; and
   (4) condensing said exhaust steam into liquid water with a steam condenser, wherein the condensed liquid water recycled into said water spray system to be sprayed into said cylinder.

6. The method according to claim 5 wherein $H_2O$ gas produced by the combusting fuel is also liquefied and reclaimed, exhausting gaseous $CO_2$ through a vent of the steam condenser.

7. The method according to claim 5 wherein an incombustible liquid is sprayed into the cylinder of the piston engine or rotary engine or wankel engine, as the medium for improving the thermal efficiency of the internal-combustion engine, the exhausted steam is led into reclaiming device for recycling after separating with $CO_2$.

* * * * *